US008051300B2

(12) United States Patent
Cherian et al.

(10) Patent No.: US 8,051,300 B2
(45) Date of Patent: Nov. 1, 2011

(54) SYSTEM AND METHOD FOR REDUCING LATENCY ON REMOTELY-BOOTED INFORMATION HANDLING SYSTEMS

(75) Inventors: Jacob Cherian, Austin, TX (US); Kevin Marks, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 979 days.

(21) Appl. No.: 11/861,025

(22) Filed: Sep. 25, 2007

(65) Prior Publication Data

US 2009/0080663 A1    Mar. 26, 2009

(51) Int. Cl.
*H04L 9/32* (2006.01)
*H04L 9/00* (2006.01)

(52) U.S. Cl. .................. 713/189; 713/193; 380/277

(58) Field of Classification Search .......... 713/189–194, 713/150; 380/277; 726/1–3, 27–30
See application file for complete search history.

(56) References Cited

U.S. PATENT DOCUMENTS

| 5,675,800 | A | 10/1997 | Fisher, Jr. et al. ............. 395/700 |
| 6,189,100 | B1* | 2/2001 | Barr et al. .................... 713/182 |
| 6,691,160 | B1 | 2/2004 | Bradley ........................ 709/222 |
| 6,925,182 | B1* | 8/2005 | Epstein ........................ 380/277 |
| 6,993,661 | B1 | 1/2006 | Garfinkel ..................... 713/193 |
| 7,162,646 | B2 | 1/2007 | Wu et al. ...................... 713/193 |
| 2006/0015931 | A1 | 1/2006 | Davis et al. .................... 726/6 |
| 2007/0050294 | A1 | 3/2007 | Trottier et al. ................. 705/50 |
| 2007/0297396 | A1 | 12/2007 | Eldar et al. .................... 370/356 |

* cited by examiner

*Primary Examiner* — Hosuk Song
(74) *Attorney, Agent, or Firm* — Bakers Botts L.L.P.

(57) ABSTRACT

Systems and methods for reducing latency on a remotely-booted information handling system are disclosed. A method may include remotely booting an information handling system having a local storage resource. The method may also include establishing, at the start of a session, an encryption key for the local storage resource for use during the session. Additionally, the method may include using the encryption key to encrypt data written to the local storage resource during the session. The method may further include permanently disabling access to the encrypted data written to the local storage resource at the end of the session.

18 Claims, 2 Drawing Sheets

SYSTEM AND METHOD FOR REDUCING LATENCY ON REMOTELY-BOOTED INFORMATION HANDLING SYSTEMS

TECHNICAL FIELD

The present disclosure relates in general to remotely-booted information handling systems, and more particularly reducing latency on remotely-booted information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures by which information handling systems boot their respective operating systems remotely from storage resources via a network. Often, these architectures are employed for numerous reasons, including without limitation: (1) increased concern with the security of data-at-rest in information handling systems, particularly in portable computing devices (e.g., notebooks, laptops, and handhelds); and (2) simplified operating system management. However, an information handling system that is remotely-booted and only allows access to storage resources via a network connection may have a disadvantage when attempting to access frequently-accessed temporary data (e.g., virtual memory page files, buffers, etc.), as data access over a network typically has a higher latency than data access via a local storage resource.

SUMMARY

In accordance with the teachings of the present disclosure, the disadvantages and problems associated with latency of data communication on a remotely-booted information handling system have been substantially reduced or eliminated.

In accordance with one embodiment of the present disclosure, a method for reducing latency in a remotely-booted information handling system is provided. The method may include remotely booting an information handling system having a local storage resource. The method may also include establishing, at the start of a session, an encryption key for the local storage resource for use during the session. Additionally, the method may include using the encryption key to encrypt data written to the local storage resource during the session. The method may further include permanently disabling access to the encrypted data written to the local storage resource at the end of the session.

In accordance with another embodiment of the present disclosure, an information handling system may include a processor, a memory communicatively coupled to the processor, and a local storage resource communicatively coupled to the processor. The local storage resource may be configured to establish, at the start of a session, an encryption key for the local storage resource for use during the session; use the encryption key to encrypt data written to the local storage resource during the session; and at the end of the session, permanently disable access to the data written to the local storage resource.

In accordance with a further embodiment of the present disclosure, a method for providing data security is provided. The method may include establishing an encryption key for a storage resource. The method may also include encrypting data written to the storage resource during a session with the encryption key and permanently disabling access to the data written to the storage resource.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
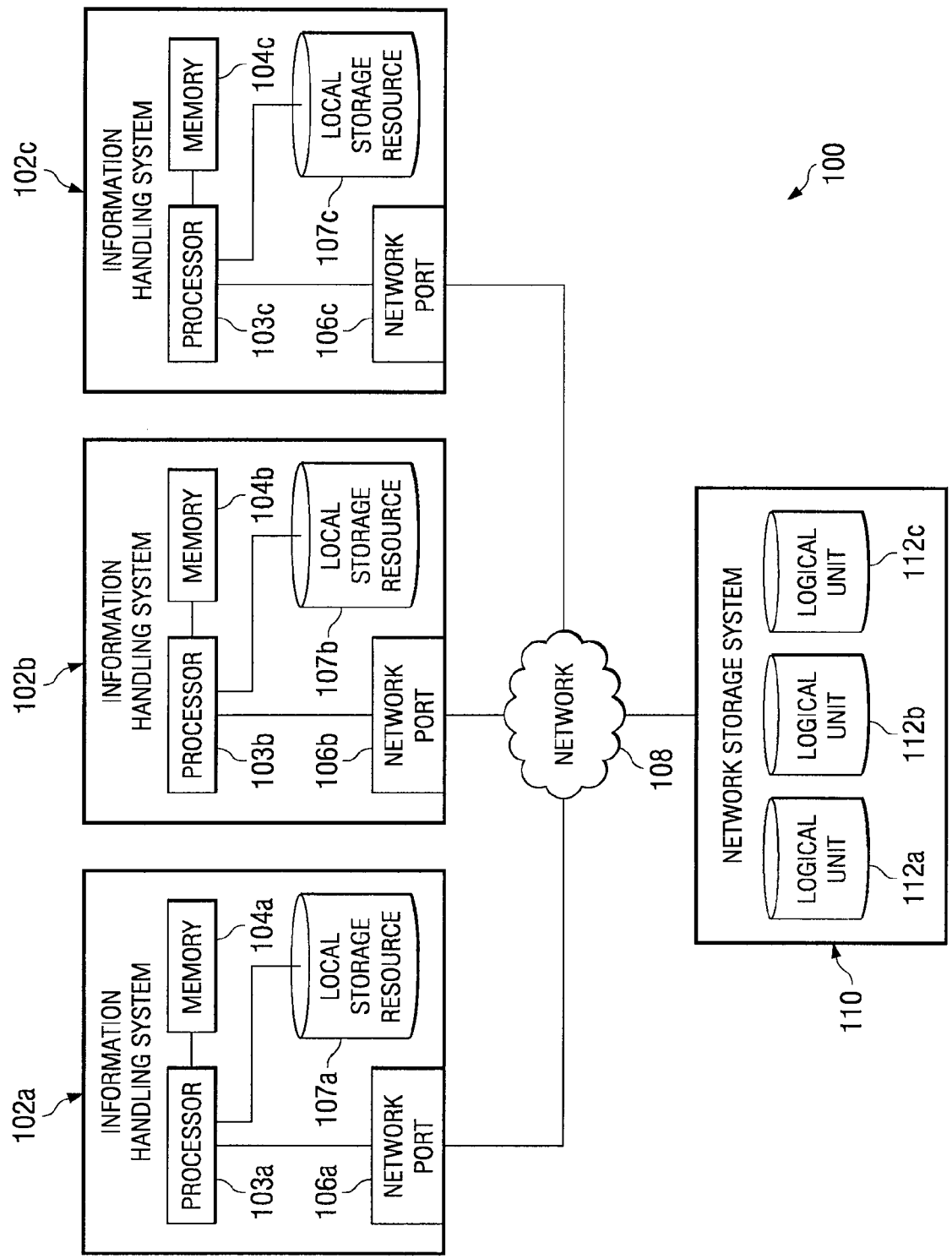
FIG. 1 illustrates a block diagram of an example system for providing data security on one or more remotely-booted information handling systems, in accordance with the present disclosure.
Figure 2:
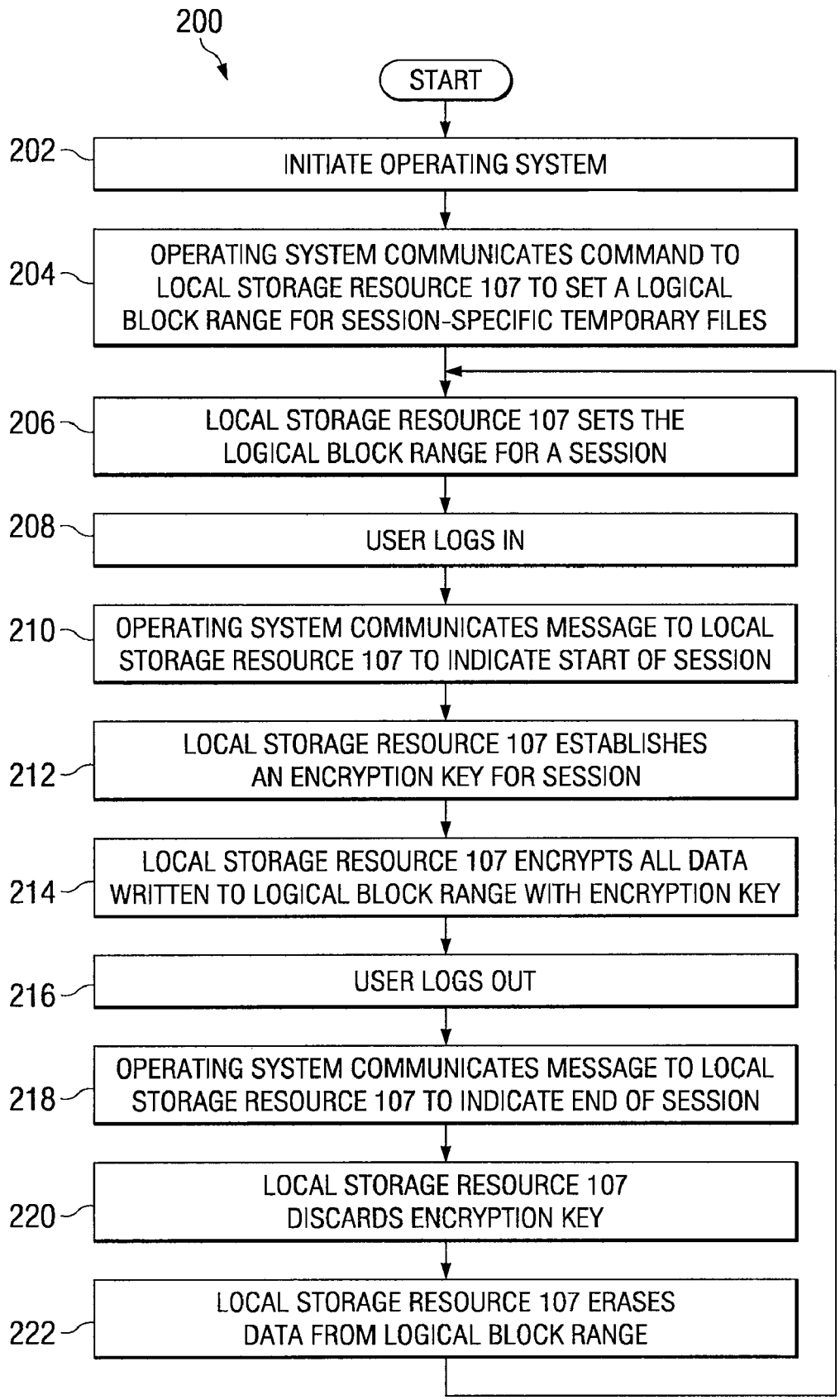
FIG. 2 illustrates a flow chart of an example method for providing data security on one or more remotely-booted information handling systems, in accordance with the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates a block diagram of an example system 100 for providing data security on one or more remotely-booted information handling systems, in accordance with the present disclosure. As depicted in FIG. 1, system 100 may comprise one or more information handling systems 102, a network 108, and a network storage system 110.

Each information handling system 102 may generally be operable to, via network 108, read data from and/or write data to one or more logical units 112 disposed in network storage system 110. In the same or alternative embodiments, each information handling system 102 may be operable to receive data from and/or communicate data to one or more other information handling systems 102 via network 108. As depicted in FIG. 1, each host device may comprise a processor 103, a memory 104 communicatively coupled to processor 103, a network port 106 communicatively coupled to processor 103, and a local storage resource 107 communicatively coupled to processor 103. For purposes of clarity, each information handling system may generally be referred to as "information handling system 102" in the present disclosure.

Each processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, each processor 103 may interpret and/or execute program instructions and/or process data stored in memory 104 and/or another component of information handling system 102.

Each memory 106 may be communicatively coupled to its associated processor 103 and may comprise any system, device, or apparatus operable to retain program instructions or data for a period of time (e.g., computer-readable media). Each memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Each network port 106 may be any suitable system, apparatus, or device operable to serve as an interface between its associated information handling system 102 and network 108. Each network port 106 may enable its respective information handling system 102 to communicate over network 108 using any suitable transmission protocol and/or standard, including without limitation all transmission protocols and/or standards enumerated below with respect to the discussion of network 108.

Each local storage resource 107 may comprise computer-readable media (e.g., hard disk drive, floppy disk drive, CD-ROM, and/or other type of rotating storage media, flash memory, EEPROM, and/or other type of solid state storage media) and may be generally operable to store data.

Although system 100 is depicted as having three information handling systems 102, system 100 may include any number of information handling systems 102.

Network 108 may be a network and/or fabric configured to couple information handling systems 102 to network storage system 110. In certain embodiments, network 108 may allow information handling systems 102 to connect to logical units 112 disposed in network storage system 110 such that the logical units 112 appear to information handling systems 102 as locally attached storage resources. In the same or alternative embodiments, network 108 may include a communication infrastructure, which provides physical connections, and a management layer, which organizes the physical connections, logical units 112 of network storage system 110, and information handling systems 102. In the same or alternative embodiments, network 108 may allow block I/O services and/or file access services to logical units 112 disposed in network storage system 110. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 108 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, software, or any combination thereof.

Network storage system 110 may comprise one or more logical units 112, and may be communicatively coupled to information handling systems 102 and/or network 108, in order to facilitate communication of data between information handling systems 102 and logical units 112. Logical units 112 may each be made up of one or more hard disk drives, magnetic tape libraries, optical disk drives, magneto-optical disk drives, compact disk drives, compact disk arrays, disk array controllers, and/or any other type of computer-readable media. In certain embodiments, one or more logical units 112 may comprise an operating system image and may serve as a boot logical unit to an associated information handling system 102 (e.g., logical unit 112a may serve as a boot logical unit for information handling system 102a). Although the embodiment shown in FIG. 1 depicts system 100 having three logical units 112, network storage system 110 may have any number of logical units 112.

In some embodiments, network storage system 110 may include one or more storage enclosures configured to hold and power one or more physical storage resources comprising logical units 112. In such embodiments, such storage enclosures may be communicatively coupled to one or more of information handling systems 102 and/or network 108, in order to facilitate communication of data between information handling systems 102 and logical units 112.

In operation, information handling system 102 may boot remotely from a corresponding boot logical unit 112. An operating system or another program executing on information handling system 102 may communicate one or more commands to its associated local storage resource 107 to indicate the start of a session. A "session," as such term is used herein, may refer to any specific period of use of an information handling system 102, and may include, without limitation: (1) the duration of time between power-on and power-off for an information handling system 102 and or its associated local storage resource 107, and (2) the duration of time between user login and user logout. In response to the communication from the operating system indicating the start of a session, local storage resource 107 may establish an encryption key for the session and encrypt all data written to local storage resource 107 during the session. At conclusion of the session, local storage resource 107 may discard the encryption key and erase all data stored to local storage resource 107 during the session.

FIG. 2 illustrates a flow chart of an example method 200 for providing data security on one or more remotely-booted information handling systems 102, in accordance with the present disclosure. In one embodiment, method 200 includes establishing an encryption key for a local storage resource 107, encrypting data written to local storage resource 107 during a session, and deleting such data at the conclusion of a session.

According to one embodiment, method 200 preferably begins at step 202. As noted above, teachings of the present disclosure may be implemented in a variety of configurations of system 100. As such, the preferred initialization point for method 200 and the order of the steps 202-222 comprising method 200 may depend on the implementation chosen.

At step 202, information handling system 102 may initiate its operating system. For example, information handling system 102 may be powered on, and may boot its operating system remotely from an associated logical unit 112. At step 204, the operating system, now executing on information handling system 102, may communicate a command to local storage resource 107 disposed in information handling system 102, the command requesting that local storage resource 107 set a logical block range for session-specific temporary files. At step 206, in response to the command of step 204, local storage resource 107 may set the logical block range for a session. For example, local storage resource 107 may reserve or dedicate a plurality of blocks within local storage resource 107 for session-specific temporary files.

At step 208, a user may login to information handling system 102. In certain embodiments, such login may indicate the beginning of a session. Accordingly, at step 210, the operating system may communicate a message to local storage resource 107 indicating the start of a session. At step 212, in response to the message of step 210, local storage resource 107 may establish an encryption key for the session using any acceptable method, format and/or standard for encryption.

During the session, local storage resource 107 may encrypt all data written to the logical block range set at step 206 with the encryption key, as represented at step 214. In certain embodiments, the data may include non-persistent data that is only applicable to a session (e.g., virtual memory page files, buffer files, and/or frequently-accessed temporary data), but may have information that a user and/or other person may desire to keep secure (e.g., medical records, financial records, trade secrets, legal advice, etc.).

At step 216, the user may logout of information handling system 102. At step 218, in response to the user's logout, the operating system may communicate a message to local storage resource 107 indicating the end of the session. At step 220, in response the message of step 218, local storage resource 107 may discard the session encryption key, thus preventing further access to the encrypted data. At step 222, local storage resource 107 may erase the data written to the session-specific logical block range. Thus, in certain embodiments, steps 220 and 222 may enable data security by discarding an encryption key for session-specific data, thereby disabling access to the session-specific data, and also deleting such session-specific data. Thus, if an error or malfunction prevents deletion of data at step 222, the session-specific data may remain inaccessible because of the discarding of the encryption key at step 220. Similarly, if an error or malfunction prevents discarding of the encryption key at step 220, the session-specific data may remain inaccessible by virtue of its deletion at step 222.

After completion of step 222, method 200 may proceed again to step 206, where local storage resource 107 may set a logical block range for a subsequent session.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. For example, in the embodiment of method 200 shown above, a session is depicted as a "user session" that begins at user login and ends at user logoff. However, as previously discussed, a session may also include a "boot session" whereby a session begins at power-on and ends at power-down. Accordingly, in embodiments including a boot session: (a) step 210 may execute after step 204 and before step 206; and/or (b) steps 218-222 may execute after a power-down of information handling system 102. In addition, some embodiments may include both user sessions and boot sessions.

Method 200 may be implemented using system 100 or any other system operable to implement method 200. In certain embodiments, method 200 may be implemented partially or fully in software embodied in computer-readable media.

Using the methods and systems disclosed herein, problems associated with conventional approaches to data security in remotely-booted information handling systems may be improved, reduced, or eliminated. For example, the methods and systems disclosed herein provide a local storage resource for storing temporary data, thus reducing latency associated with accessing such data. In addition, to provide data security for data stored on the local storage resource, such data may be encrypted when stored and the data and/or an encryption key may be deleted at the conclusion of each session, thus reducing the chances unauthorized access to such data.

Although the present disclosure has been described in detail, it should be understood that various changes, substitutions, and alterations can be made hereto without departing from the spirit and the scope of the disclosure as defined by the appended claims.

What is claimed is:

1. A method for reducing latency in a remotely-booted information handling system, comprising:
   remotely booting an information handling system having a local storage resource;
   at the start of a session, establishing an encryption key for the local storage resource for use during the session;
   using the encryption key to encrypt data written to the local storage resource during the session; and
   at the end of the session, permanently disabling access to the encrypted data written to the local storage resource.

2. The method according to claim 1, wherein permanently disabling access to the data written to the local storage resource includes at least one of:
   discarding the encryption key; and
   erasing the data from the local storage resource.

3. The method according to claim 1, wherein the data written to the local storage resource is data specific to the session.

4. The method according to claim 3, wherein the data written to the local storage resource includes at least one of:
   a virtual memory page file; and
   a memory buffer.

5. The method according to claim 1, wherein the session includes a duration of time beginning with a user login to the information handling system and ending with a user logoff from the information handling system.

6. The method according to claim 1, wherein the session includes a duration of time beginning with a boot of an operating system executing on the information handling system and ending with the closing of the operating system.

7. The method according to claim 1, further comprising:
   setting a logical block range for the session; and
   writing all data written to the local storage resource to the logical block range.

8. An information handling system comprising:
   a processor;
   a memory communicatively coupled to the processor; and
   a local storage resource communicatively coupled to the processor and configured to:
     at the start of a session, establish an encryption key for the local storage resource for use during the session, wherein the session includes a duration of time beginning with a boot of an operating system executing on the information handling system and ending with the closing of the operating system;
     use the encryption key to encrypt data written to the local storage resource during the session; and
     at the end of the session, permanently disable access to the data written to the local storage resource.

9. The information handling system according to claim 8, further comprising:
   a network interface communicatively coupled to the processor; and
   a logical unit communicatively coupled to the network interface via a network, the logical unit having an operating system image from which the information handling system is configured to boot.

10. The information handling system according to claim 8, wherein permanently disabling access to the data written to the local storage resource includes at least one of:
    discarding the encryption key; and
    erasing the data from the local storage resource.

11. The information handling system according to claim 8, wherein the data written to the local storage resource is data specific to the session.

12. The information handling system according to claim 11, wherein the data written to the local storage resource includes at least one of:
    a virtual memory page file; and
    a memory buffer.

13. The information handling system according to claim 8, wherein the session includes a duration of time beginning with a user login to the information handling system and ending with a user logoff from the information handling system.

14. The information handling system according to claim 8, the local storage resource further configured to:
    set a logical block range for the session; and
    write all data written to the local storage resource to the logical block range.

15. A method for providing data security, comprising:
    establishing an encryption key for a storage resource for use during a session,
    wherein the session includes a duration of time beginning with the powering up of the storage resource and ending with the powering down of the storage resource;
    encrypting data written to the storage resource during the session with the encryption key; and
    permanently disabling access to the data written to the storage resource after completion of the session.

16. The method according to claim 15, wherein permanently disabling access to the data written to the storage resource includes at least one of:
    discarding the encryption key; and
    erasing the data from the storage resource.

17. The method according to claim 15, wherein the storage resource is an integral part of an information handling system, and the session includes a duration of time beginning with a user login to the information handling system and ending with a user logoff from the information handling system.

18. The method according to claim 15, further comprising:
    setting a logical block range for the session; and
    writing all data written to the storage resource to the logical block range.

* * * * *